H. BUSH.
SAFETY PIN.
APPLICATION FILED NOV. 17, 1917.

1,299,675.

Patented Apr. 8, 1919.

INVENTOR.
Hardy Bush
BY
Dyke & Camfield, his
ATTORNEYS.

UNITED STATES PATENT OFFICE.

HARDY BUSH, OF NEWARK, NEW JERSEY.

SAFETY-PIN.

1,299,675.　　　　Specification of Letters Patent.　　Patented Apr. 8, 1919.

Application filed November 17, 1917.　Serial No. 202,648.

*To all whom it may concern:*

Be it known that I, HARDY BUSH, a citizen of the United States, and a resident of Newark, county of Essex, and State of New Jersey, have invented certain new and useful Improvements in Safety-Pins, of which the following is a specification.

My invention relates to safety pins, and while it has application to safety pins generally, it is more especially adapted for application to safety pins made entirely or substantially entirely from wire and used in locations where it is desired that the pin and the parts of apparel secured thereby set evenly and smoothly, as, for example, in fastening the back of a skirt to a shirtwaist, or the pin is prominently exposed to view, as, for example, in the fastening together of the tabs of soft collars, etc.

With safety pins made entirely or substantially entirely of wire as heretofore constructed there has been, so far as I am aware, a projection of the material for forming the hook for receiving and holding the pin point, such that when the pin is adjusted in position, as, for example, to hold the tabs of a soft collar, the presence of such projecting hook portion causes a canting or twisting or undue projection of the hook end of the pin, so that parts do not lie smoothly and an uneven and untidy appearance is presented, the safety pin usually projecting farther out on the hook end and being more prominent or exposed there than at the opposite end.

An object of the present invention is the provision of a safety pin constructed entirely or substantially entirely from wire which is of balanced construction at its opposite ends, has no undue projection at the hook end and generally is free from the objectionable features above referred to.

Figure 1:
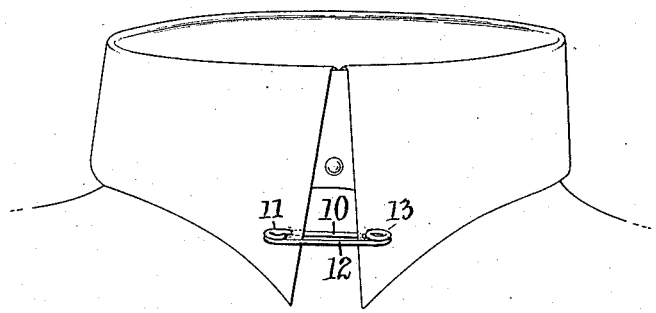
Figure 2:
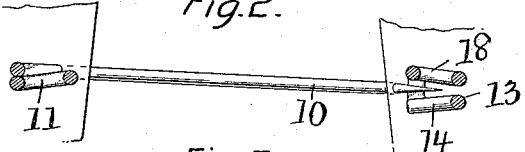
Figure 3:
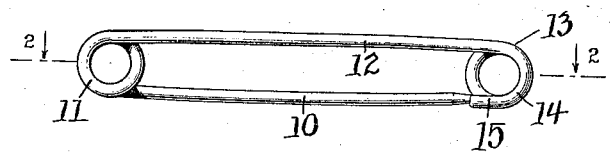
Figure 4:
Figure 5:
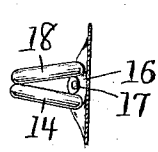
Figure 6:
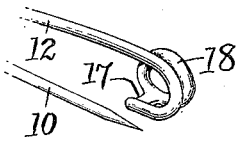

One form of safety pin embodying my invention is illustrated in the accompanying drawing which is intended only to afford a clear understanding of the invention. In the said drawing, Figure 1 is a front view showing a safety pin embodying my invention inserted in the tabs of a collar. Fig. 2 is an enlarged sectional detail view, the section being taken on line 2—2, Fig. 3, and fragments of the tabs of a collar being illustrated in connection therewith. Fig. 3 is a side view of the pin. Fig. 4 is a bottom plan view thereof. Fig. 5 is an end view, a part of a collar being shown in section, and Fig. 6 is a fragmentary perspective view of the end of the safety pin at which the pin point and catch are located.

The safety pin preferably comprises the usual sharp pointed member or pin for insertion into material in which the safety pin is secured, and which, for convenience of terminology, will be referred to as the stiletto and is indicated by reference numeral 10. The safety pin is preferably formed entirely or principally of bent wire and the material is preferably coiled on itself at the end of the safety pin opposite the stiletto point and may form a coil 11, affording a desirable spring action, and to provide a catch for the stiletto point which holds it firmly in place and substantially parallel to the bar 12 without undesirable projection. The back bar 12 of the pin is preferably a continuation of the wire forming the stiletto 10 and coil 11, and the head 13 of the pin is preferably so constructed as to provide the same general appearance as the coil portion 11. One way of obtaining this result is that shown in the drawing, in which the wire from which the safety pin is formed is brought around in a hook 14 comprising a portion 15 extending for a short distance substantially parallel to the back bar 12, and the wire or other material thence extended substantially directly across the axis of the stiletto 10, as shown best at 16 in Fig. 4, being thinned or recessed on its inner side somewhat in this neighborhood to afford a recess or catch 17 for receiving the point of the stiletto 10 in such relation that when the closed pin is viewed from the side (Fig. 3) the portion 15 of the hook member 14 is or appears as substantially a continuation of the stiletto 10, and beyond the cross member 16 there is formed, of the wire or other material, or secured, as by soldering, a ring 18 which serves to complete the head and to prevent movement of the stiletto beyond the catch recess 17, or in other words, to limit the inward lateral movement of the stiletto in placing the same in the catch or catch recess. The ring 18, which is preferably a closed ring, also serves to give to the head end of the pin substantially the same appearance as the coiled end 11 and to give the safety pin the desirable balanced construction which permits it to set smoothly. The ring 18 may be formed separately and soldered in place, or the entire safety pin may be formed from a single length of material such as wire.

When the pin is inserted in place in apparel, as, for instance, in the tabs of a soft collar, in connection wherewith it is illustrated in Fig. 1, it will be seen that a secure holding effect is obtained, that the parts secured by the ends of the stiletto bear the same relation, respectively, to the coil 11 and the ring 18, and the stiletto 10 and back 12 are substantially parallel to one another and there is no canting or twisting or undue projection of the hook end beyond the generally oval outline of the pin, but that the parts all lie flat and smooth and give a neat and handsome appearance, substantially the appearance of a coil being presented at each end.

It is to be understood that the embodiment shown is for the purpose of affording a clear understanding of my invention only, and that I am not to be limited thereto except as is required by my claims, but that modifications and changes from what is shown may be resorted to within the scope of my claims and without departing from my invention or sacrificing its advantages.

I claim:

In a wire safety pin, a stiletto, a back bar substantially parallel thereto, a coil at one end of the pin connecting the back bar and stiletto, a hooked portion on the opposite end of the back bar, a ring portion adjacent and substantially parallel to the hook portion, and a cross bar connecting said hooked portion and ring portion, the hooked portion, ring portion and cross bar forming a head of generally coil-like form and the cross bar serving to releasably receive and hold the stiletto point.

In testimony that I claim the foregoing I have hereto set my hand this 16th day of November, 1917.

HARDY BUSH.

Copies of this patent may be obtained for five cents each, by addressing the "Commissioner of Patents, Washington, D. C."